United States Patent
Ooi et al.

(10) Patent No.: US 11,575,442 B2
(45) Date of Patent: Feb. 7, 2023

(54) PEROVSKITE-DOPED FIBER-AMPLIFIER FOR OPTICAL FIBER COMMUNICATION USING VISIBLE LIGHT

(71) Applicant: KING ABDULLAH UNIVERSITY OF SCIENCE AND TECHNOLOGY, Thuwal (SA)

(72) Inventors: Boon Siew Ooi, Thuwal (SA); Chun Hong Kang, Thuwal (SA); Tien Khee Ng, Thuwal (SA); Osman M. Bakr, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/423,233

(22) PCT Filed: Feb. 19, 2020

(86) PCT No.: PCT/IB2020/051394
§ 371 (c)(1),
(2) Date: Jul. 15, 2021

(87) PCT Pub. No.: WO2020/174322
PCT Pub. Date: Sep. 3, 2020

(65) Prior Publication Data
US 2022/0077933 A1    Mar. 10, 2022

Related U.S. Application Data

(60) Provisional application No. 62/809,987, filed on Feb. 25, 2019.

(51) Int. Cl.
*H04B 10/291* (2013.01)
*H04B 10/116* (2013.01)
*H04B 10/294* (2013.01)

(52) U.S. Cl.
CPC ....... *H04B 10/2912* (2013.01); *H04B 10/116* (2013.01); *H04B 10/294* (2013.01)

(58) Field of Classification Search
CPC .................................. H04B 10/2912
See application file for complete search history.

(56) References Cited

U.S. PATENT DOCUMENTS 7,715,094 B2    5/2010  Tokura et al.
2017/0152608 A1*  6/2017  Jin ........................ C30B 29/60
(Continued)

FOREIGN PATENT DOCUMENTS

WO    2017195062 A1    11/2017

OTHER PUBLICATIONS

Bamiedakis, N., et al., "Micro-LED-Based Guided-Wave Optical Links for Visible Light Communications," 2015 17th International Conference on Transparent Optical Networks (ICTON), Jul. 1, 2015, pp. 1-4, IEEE.

(Continued)

*Primary Examiner* — Nathan M Cors
(74) *Attorney, Agent, or Firm* — Patent Portfolio Builders PLLC

(57) ABSTRACT

A plastic optical fiber communication system includes a light source that emits a first signal having a first wavelength in a visible light spectrum, the first signal being encoded with information at a high data-rate of 0.1 to 10 Gbit/s; a pump laser system that emits a pump laser light having a second wavelength, different from the first wavelength; a perovskite-doped optical fiber excited by the pump laser light to generate an amplified spontaneous emission spectrum that encompasses the first wavelength so as to receive and amplify the first signal for generating an amplified output signal having the first wavelength; and a photodetector optically coupled to the perovskite-doped optical (Continued)

fiber, and configured to receive the amplified output signal at the high data-rate of 0.1 to 10 Gbit/s. The amplified output signal is encoded with the information.

21 Claims, 8 Drawing Sheets

(56) References Cited

U.S. PATENT DOCUMENTS

| | | | |
|---|---|---|---|
| 2018/0312754 A1 | 11/2018 | Pan et al. | |
| 2018/0374651 A1* | 12/2018 | Blackburn | H01L 51/0032 |
| 2019/0145587 A1* | 5/2019 | Dursun | C09K 11/883 |
| | | | 250/458.1 |
| 2020/0185630 A1* | 6/2020 | Ke | C07F 7/24 |
| 2021/0296622 A1* | 9/2021 | Alivisatos | H01L 51/5056 |

OTHER PUBLICATIONS

International Search Report in corresponding/related International Application No. PCT/IB2020/051394, dated Jun. 4, 2020.
Written Opinion of the International Searching Authority in corresponding/related International Application No. PCT/IB2020/051394, dated Jun. 4, 2020.

* cited by examiner

PEROVSKITE-DOPED FIBER-AMPLIFIER FOR OPTICAL FIBER COMMUNICATION USING VISIBLE LIGHT

CROSS-REFERENCE TO RELATED APPLICATIONS

This application is a U.S. National Stage Application of International Application No. PCT/IB2020/051394, filed on Feb. 19, 2020, which claims priority to U.S. Provisional Patent Application No. 62/809,987, filed on Feb. 25, 2019, entitled "PEROVSKITE-DOPED FIBER AMPLIFIER AND LARGE-AREA PHOTODETECTION FOR VISIBLE LIGHT COMMUNICATION," the disclosures of which are incorporated herein by reference in their entirety.

BACKGROUND

Technical Field

Embodiments of the subject matter disclosed herein generally relate to a system and method for optical fiber communication using visible light, and more particularly, to a perovskite-doped fiber that can be used as an optical amplifier for plastic optical-fiber-based communication.

Discussion of the Background

Following the first demonstrations in the early 1980s, fiber-optics have played a major role in today's telecommunications industry, by offering up to terabits-per-second (Tbit/s) transmission over hundreds of kilometers long distance. The fiber-optics communication technology, operating at 1300 nm and 1550 nm wavelengths, relies heavily on erbium-doped fiber amplifier (EDFA) to significantly reduce optical signal loss without converting the transmitted signal to electrical domain. In this regard, note that a typical optical fiber communication link may extend for hundreds or thousands of kilometers, and for this large distance, the optical losses are substantial if no amplification is provided. High gain of up to 30 dB achieved in EDFA have revolutionized the optical communication world. This important discovery has allowed long transmission distance, low-signal distortion and cost effectiveness as compared to using repeaters. A repeater is an optical device that is placed along the optical fiber to amplify the amplitude of the optical signal, based on an electrical power source.

However, the number of mobile devices that are presently used has greatly increased in the past years. Smartphones, tablets and various sensors are penetrating all the households and fields of industry. It is common today, in the residential field, to monitor the temperature inside the house, the status of the locks, the perimeter of the house, the power consumption, the weather, etc. while in the industrial field, any possible parameter is monitored with a sensor connected to the internet. These devices and sensors are becoming more and more common and they are also becoming more hungry for higher communication bandwidth in order to provide fast data transmission or information exchange to various servers and end users.

In addition, the era of Internet-of-Things (IoT) is putting more pressure on the existing communication infrastructure as each known device is now being connected to the Internet. For example, common devices such as TVs, microwaves, refrigerators, and vehicles will be connected non-stop to the Internet, requiring even more resources, either from the devices themselves or from the supporting network infrastructure. Considering this scenario, the increasing crowding of the electromagnetic spectrum band allocated to the Wi-Fi becomes a serious problem that needs to be solved as the existing infrastructure cannot provide the appropriate resources for wireless communication. Thus, new technologies needed to alleviate the spectrum crunch experienced by the Wi-Fi, especially when the collective IoT and mobile data are received by base stations.

As an example, in relaying high data capacity across base stations, visible light communication (VLC) technology, which offers hundreds of terahertz of bandwidth, is currently being developed for fifth generation network and beyond. It is envisaged that direct collection of visible light signal and subsequent transmission through the optical fiber operating in the visible light signal could simplify the overall system design, i.e., without the need of converting from optical-to-electrical signal.

However, the current silica-based optical fiber technology cannot directly amplify visible light in the 400-700 nm regime. Alternately, plastic optical fiber (POF), i.e., an optical fiber that is made out of a polymer, thus, being robust under bending and stretching, can offer such flexibility in incorporating an optical amplifier element that can work in the required visible wavelength regime. The use of amplifier is required to overcome signal losses over a long transmission distance in the regime.

In addition, the use of POF offers higher flexibility, higher elastic limits, as well as more impact resistance, as compared to the conventional silica-based fibers. POF communication, with a low loss window between ~500 to ~650 nm, allows optical communication at very high speeds (theoretically in the order of terabytes/s). Due to the inherent advantages of POF mentioned above, the use of highly elastic POF could also open up a plethora of applications, e.g., in-situ healthcare monitoring, automotive interiors, home/office networks, as well as, flexible lighting applications.

Thus, there is a need for a new type of optical fiber that can be used as an optical amplifier for optical fiber communication in the visible light regime based on POF.

BRIEF SUMMARY OF THE INVENTION

According to an embodiment, there is a plastic optical fiber communication system that includes a light source that emits a first signal having a first wavelength in a visible light spectrum, the first signal being encoded with information at a high data-rate of 0.1 to 10 Gbit/s; a pump laser system that emits a pump laser light having a second wavelength, different from the first wavelength; a perovskite-doped optical fiber excited by the pump laser light to generate an amplified spontaneous emission spectrum that encompasses the first wavelength so as to receive and amplify the first signal for generating an amplified output signal having the first wavelength, and a photodetector optically coupled to the perovskite-doped optical fiber, and configured to receive the amplified output signal at the high data-rate of 0.1 to 10 Gbit/s. The amplified output signal is encoded with the information.

According to another embodiment, there is a plastic optical fiber communication system that includes a first light source that emits a first signal having a first wavelength in a visible light spectrum, the first signal being encoded with information at a high data-rate of 0.1 to 10 Gbit/s; a second light source that emits the visible light having a second wavelength, different from the first wavelength; a perovskite-doped optical fiber excited by the visible light without any coupling system to generate an amplified spontaneous emission spectrum that encompasses the first wavelength so as to receive and amplify the first signal for generating an amplified output signal having the first wavelength, and a photodetector optically coupled to the perovskite-doped optical fiber, and configured to receive the amplified output signal. The amplified output signal is encoded with the information.

According to yet another embodiment, there is a method for transmitting information in a visible light spectrum at a high data-rate of 0.1 to 10 Gbit/s. The method includes emitting a first signal with a light source, the first signal having a first wavelength in the visible light spectrum and being encoded with information; emitting a second signal having a second wavelength, different from the first wavelength; injecting the first signal and the second signal into a perovskite-doped optical fiber; converting the second wavelength to an amplified spontaneous emission spectrum that encompasses the first wavelength using a wavelength-converting material, which is the perovskite-doped optical fiber; amplifying the first signal to generate an amplified output signal having the first wavelength; and receiving and decoding the amplified output signal to extract the information.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a plastic optical fiber communication system that uses a perovskite-doped optical fiber amplifier.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a perovskite-doped optical fiber amplifier is tailored for optical signal amplification in the visible light regime for plastic optical fiber communication. In one application, information transmitted with such optical fiber amplifier reaches a high data-rate of 0.1 to 10 Gbit/s. The perovskite may be an organometallic or inorganic halide perovskite, with the general formula of $AMX_3$, where A stands for an organic component like $CH_3NH_3$ or inorganic component like Cs, M stands for an alkali metal, like Pb, and X stands for a halide, like Br, Cl or I. The organometallic or inorganic halide perovskite has emerged in recent years as a promising material for various optoelectronics devices and applications, e.g., solar cells, LEDs, and photodetectors. Highly-stable perovskite-based materials with low photoluminescence lifetime in the order of ns have also been widely reported [1]. Moreover, the phenomena of amplified spontaneous emission (ASE) in perovskite-based material had also been observed, elucidating its potential as a gain medium in the visible light region.

This material may be used to form a perovskite-doped fiber amplifier operating in the visible wavelength region, which differs from the erbium-doped fiber amplifier (EDFA) that operates at 1550 nm wavelength region, i.e., not in the visible light spectrum. Various devices discussed in the following embodiments can be targeted for various applications in plastic optical fiber communication where the transmitted signal can be in the visible wavelength region.

Figure 1:
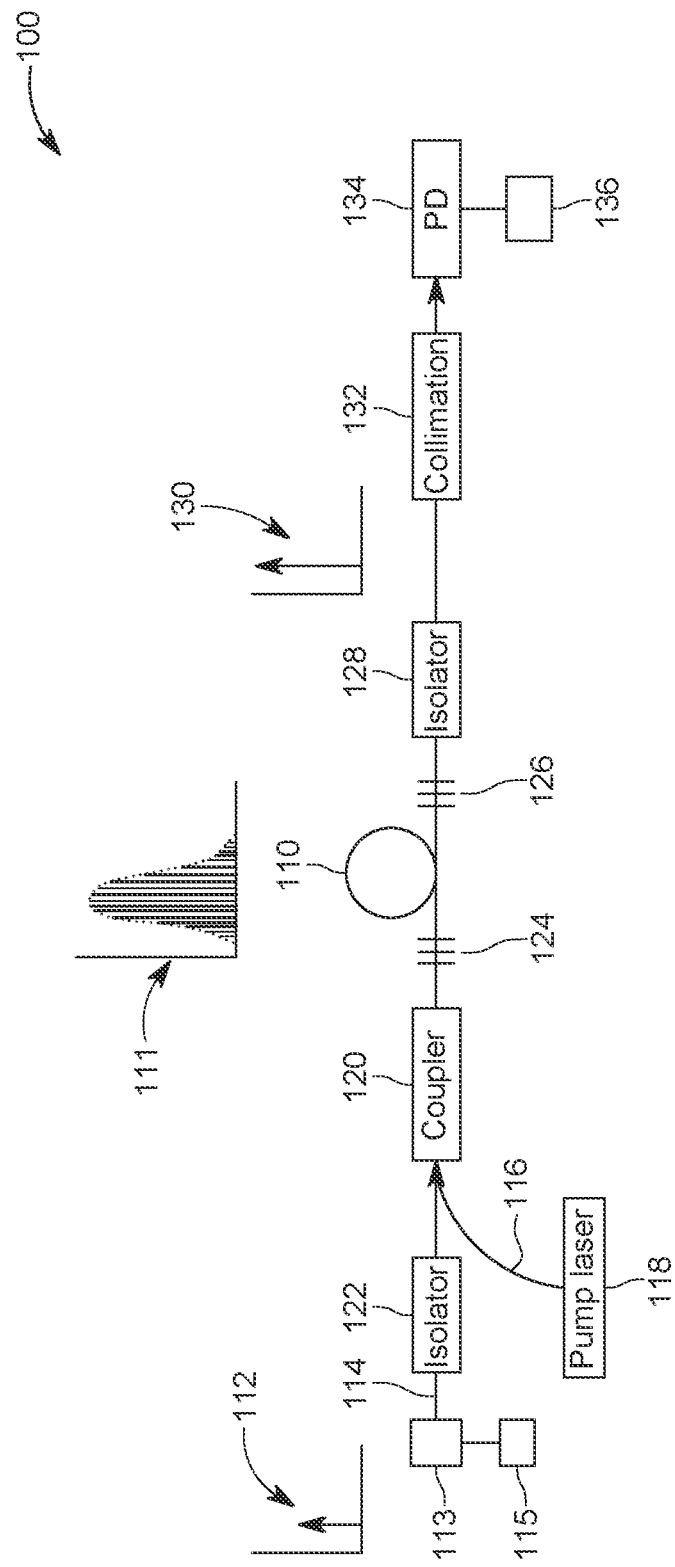
FIG. 1 is a schematic diagram of a plastic optical fiber communication system that uses a perovskite-doped optical fiber amplifier.

More specifically, as illustrated in FIG. 1, a perovskite-doped optical fiber system 100 is configured for optical signal amplification. The optical fiber system 100 includes a perovskite-doped fiber 110 (called herein "doped fiber") that acts as a gain medium. An input signal 112 having a first wavelength $\lambda_1$ is entered into an undoped fiber 114 and combined with a pump laser light 116, having a second wavelength $\lambda_2$, which is generated by a pump laser 118. In one application, the first wavelength is different from the second wavelength, but both wavelengths are in the visible spectrum. In another application, the first wavelength is in the green range and the second wavelength is in the blue range. Other ranges and values may also be used.

The two signals 112 and 116 are coupled together using a coupler 120. An isolator 122 may be located along the optical fiber 114, upstream the coupler 120, for preventing excess noise and unwanted oscillations due to the reflection in the fiber system. The term "upstream" is used herein to mean a position closer to the source of the light. The pump light 116 propagates in the same direction as the input signal 112 and they both enter and excite the doped fiber 110.

Two gratings 124 and 126 may be placed to sandwich the doped fiber 110, one upstream and the other one downstream from the doped fiber, to create an optical cavity for signal amplification. In this embodiment, the cladding layer of the doped fiber 110 has a refractive index $n_1$ less than that of the doped core layer $n_2$, i.e., $n_2 > n_1$. Due to the difference in the refractive index between the cladding and core layers, the amplified wavelength-converted light would propagate along the core and exit at the end of the doped fiber 110, toward a second isolator 128, as output signal 130. The amplified output light 130 has the first wavelength $\lambda_1$, as the perovskite-doped fiber 110 transforms the second wavelength of the pump light 116 to an amplified spontaneous emission spectrum 111 that encompasses the first wavelength of the input signal 112. In other words, the perovskite-doping of the fiber 110 is selected so that the second wavelength is transformed, or down-converted, to encompass the first wavelength, to achieve the desired amplification of the input signal 112. The amplified output light 130 is amplified in terms of its amplitude because the pump light adds energy to the original input signal 112. Note that this amplification process takes place without transforming the input signal 112 into an electrical signal and back into the optical signal as a repeater does. The amplified output light 130 may pass, upon its exit from the doped fiber 110, through the second isolator 128, a collimation system 132 having a filter and it is then guided into a high-speed photodetector (PD) 134. In this embodiment, the input signal 112 and the pump laser light 116 may be generated with any laser diode that generates a wavelength in the visible wavelength region. For example, the input signal 112 may be generated with a laser device 113 that is connected to a computing device 115, which is configured to encode data into the input signal 112 generated by the laser device 113. In this way, information may be transmitted from the computing device 115 to the photodetector 134. The photodetector 134 may be connected to another computing device 136, which is configured to decode the data carried by the input signal 112. Note that the perovskite-doped optical fiber 110 and the other optical components discussed herein do not distort the input signal 112 to affect the encoded data. The doped optical fiber 110 only amplifies the amplitude of the input signal 112, without changing its wavelength, so that the carried data (the information) is not affected by the amplification process. The doped optical fiber 110 is tuned with the perovskite material to change only the wavelength of the pump light 116 to encompass the wavelength of the input signal 112. The computing devices 115 and 136 may be a computer, a smartphone, a tablet, a server, a sensor, etc.

Figure 2A:
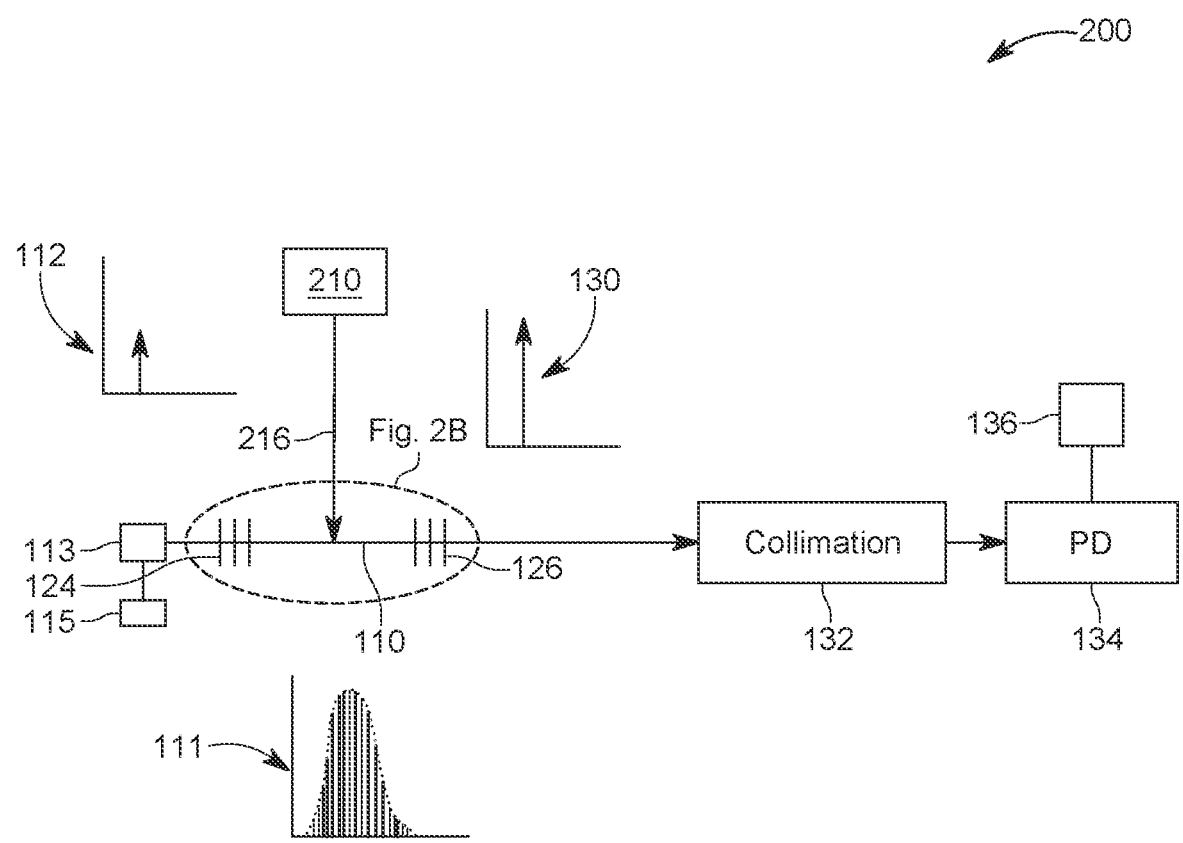
FIG. 2A illustrates another plastic optical fiber communication system that uses a perovskite-doped optical fiber amplifier and FIG. 2B shows in detail the optical fiber amplifier.

While the system 100 uses a pump laser 118 to generate the pump light 116 having the second wavelength, for amplifying the input signal 112, FIG. 2A shows a different system in which the light emitted by the pump source 210 can enter through the cladding layer 222 into the core layer of fiber 110. More specifically, the system 200 in FIG. 2A uses a light source 210 that can be any existing source that generates light in the visible spectrum, e.g., an LED, a superluminescent diode (SLD), a laser diode, etc. The light source 210 generates a visible light 216. The visible light 216 is sent directly onto the perovskite-doped fiber 110, without using a coupler or any other optical device illustrated in the embodiment of FIG. 1.

Figure 2B:
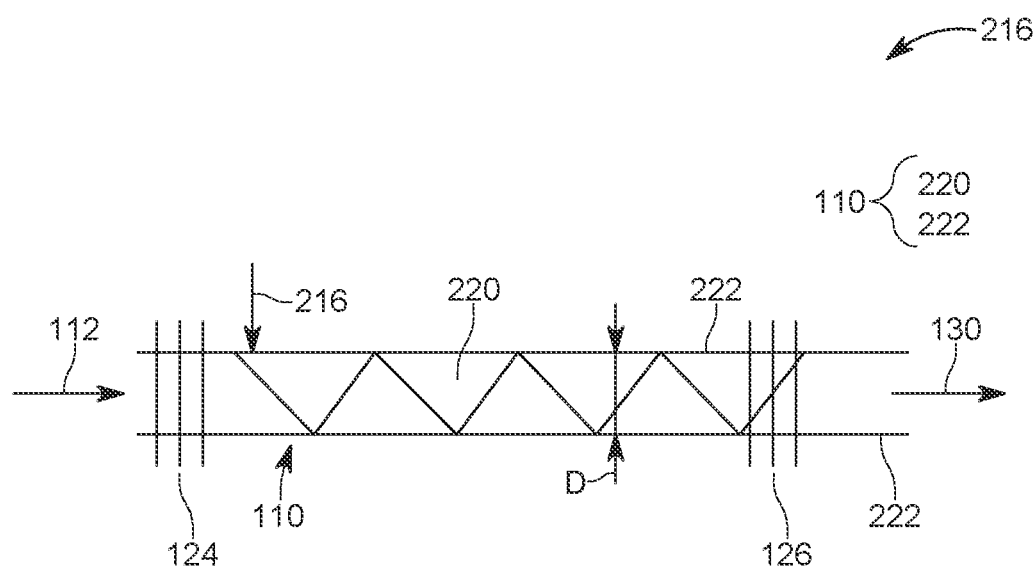

More specifically, as shown in FIG. 2B, the input signal 112 enters the doped fiber 110 from one end, and the visible light 216 enters into the core layer 220 of the doped fiber 110, directly through the cladding layer 222 and amplifies the input signal 112 to increase its amplitude. In this embodiment, the core layer 220 of the fiber 110 is doped with a down-converting material, i.e., the perovskite material, which may be an organometal or inorganic halide perovskite with the general formula of $AMX_3$. In one application, the wavelength-converting material has a PL decay lifetime of less than 10 ns.

In another application, the wavelength-converting material can include organometallic or inorganic halide perovskite having the formula $ABX_3$ (where A is selected from $Cs^+$, $Rb^+$, $CH_3NH_3^+$, and $HC(NH_2)_2^+$, B is selected from $Pb^{2+}$, $Sn^{2+}$, $Ge^{2+}$, $Mg^{2+}$, $Ca^{2+}$, $Sr^{2+}$, $Ba^{2+}$, $Cu^{2+}$, $Fe^{2+}$, $Pd^{2+}$, and $Eu^{2+}$, and X is a halogen $Cl^-$, $Br^-$ or $I^-$) and lifetime of less than 10 ns. In still another application, the organometallic or inorganic halide perovskite can have a thickness of less than 1,000 micron. In this embodiment, the length and width of the wavelength-converting layer can be designed based on a particular usage, from nanometer scale to centimeter scale or even higher.

In this embodiment, the cladding layer 222 has a transparency of more than 80% in the visible wavelength region, so that the visible light 216 can enter through the cladding layer into the core layer. In one application, the cladding layer 222 has a refractive index $n_1$ less than that of the doped core layer $n_2$, i.e., $n_2 > n_1$. In the embodiment of FIG. 2B, a diameter D of the doped optical fiber 110 could be between 0.01 to 10 mm.

Figure 3A:
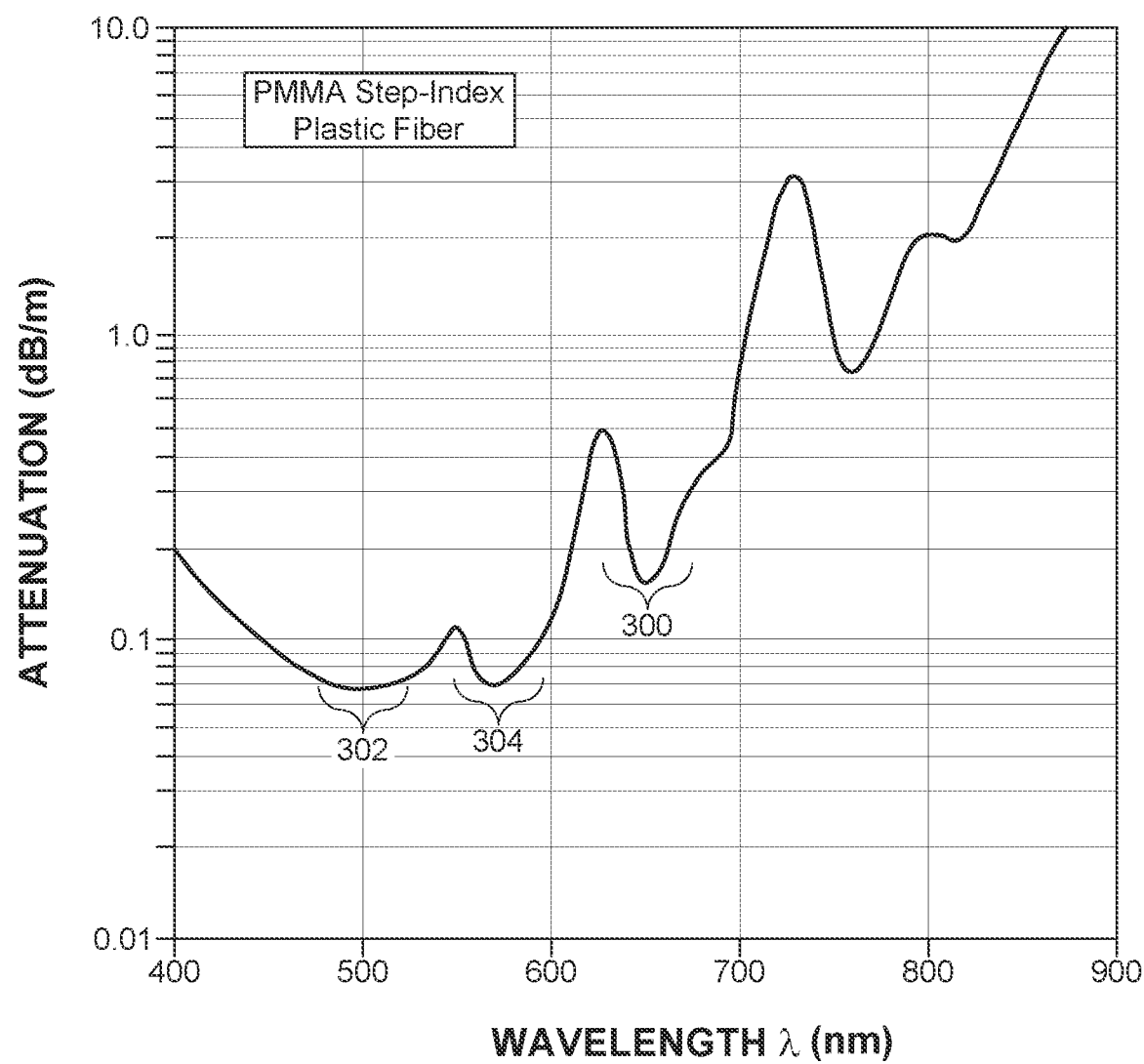
FIG. 3A illustrates the signal attenuation for a plastic optical fiber versus the wavelength.

In one embodiment, the amplified output light 130 can have a wavelength in the visible wavelength region, i.e., 500 nm to 680 nm, which corresponds to a low loss window of the plastic optical fiber system. The attenuation for a POF for various wavelengths is illustrated in FIG. 3A (which corresponds to FIG. 22.3 in Light-emitting diodes by E. F. Schubert), and shows a preferred window 300 for visible light communication. FIG. 3A also shows that a POF based communication system also has a lowest loss-window 302 in the vicinity of 500 nm (i.e., within a 30 nm range around the 500 nm value) or a next lowest loss-window 304 in the range of 560 to 575 nm or another loss-window centered on the 650 nm. Based on these values, in one embodiment, the wavelength converting material of the doped optical fiber 110 is selected to down-convert the incoming light 216 to a longer visible wavelength in the 400 to 800 range, or to a lowest loss window centered on 500 nm, or to a next low loss window in the 560 to 575 nm range, or to another loss window centered on the 650 nm. For the system 200, the grating 124 has a reflectivity ($R_1$) larger than 90% at the emission wavelength of the doped fiber and the grating 126 has a reflectivity ($R_2$) smaller than $R_1$.

Figure 3B:
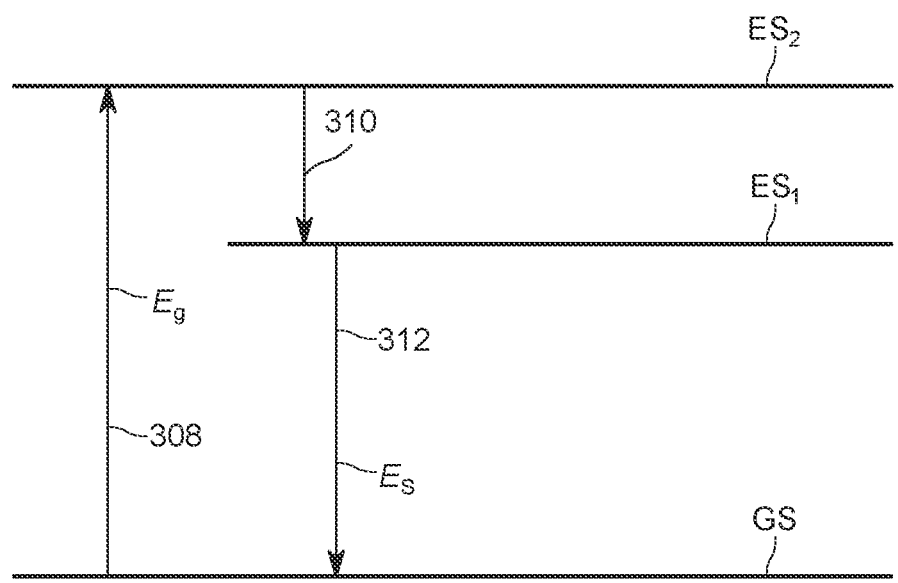
FIG. 3B illustrates the energy level of the various states in the perovskite-doped optical fiber.

The light-amplification that happens in the doped optical fiber 110 is now discussed with regard to FIG. 3B. This figure shows the energy states associated with the perovskite-doped optical fiber material. FIG. 3B shows a ground state GS, a first excited state $ES_1$ and a second excited state $ES_2$. At least one excited state, typically the $ES_1$, is due to the doping material, i.e., the perovskite material in this case. This means that the visible light 116 or 216 that enters the doped fiber 110, excites an electron from the ground state GS to a second excited state $ES_2$ when absorbing the visible light (energy Eg, or wavelength $\lambda_2$), so that this electron follows path 308. This excited electron then follows path 310 to the first excited state $ES_1$. Plural electrons can exist in this state and due to their short decay time, they all decay substantially simultaneously, along path 312, back to the ground state GS when the input light at first wavelength $\lambda_1$, i.e., having the energy Es passes through the perovskite materials, and thus acts as an amplifier for the input signal 112, and generates the amplified output signal 130. In this way, the doped fiber 110 does not affect the wavelength $\lambda_1$ of the input signal, but is pumped to amplified spontaneous emission taking energy from wavelength $\lambda_2$ of the additional light 116 or 216, so that the first wavelength signal is amplified.

In the embodiments of FIGS. 1 and 2A, the photodetector 134 can be a high-speed photodetector that include, but is not limited to, high-speed Si-based, group III-nitride-based, SiC-based photodiode, and avalanche photodetectors. If the input signal 112 is encoded with data, the high-speed photodetector 134 can decode the transferred data, after converting the output optical signal 130 to an electrical signal.

In the same embodiments, the collimation system 132 may include one or more lenses, for example, aspheric lenses, plano-convex lenses, and aspheric fiber collimators.

Figure 4:
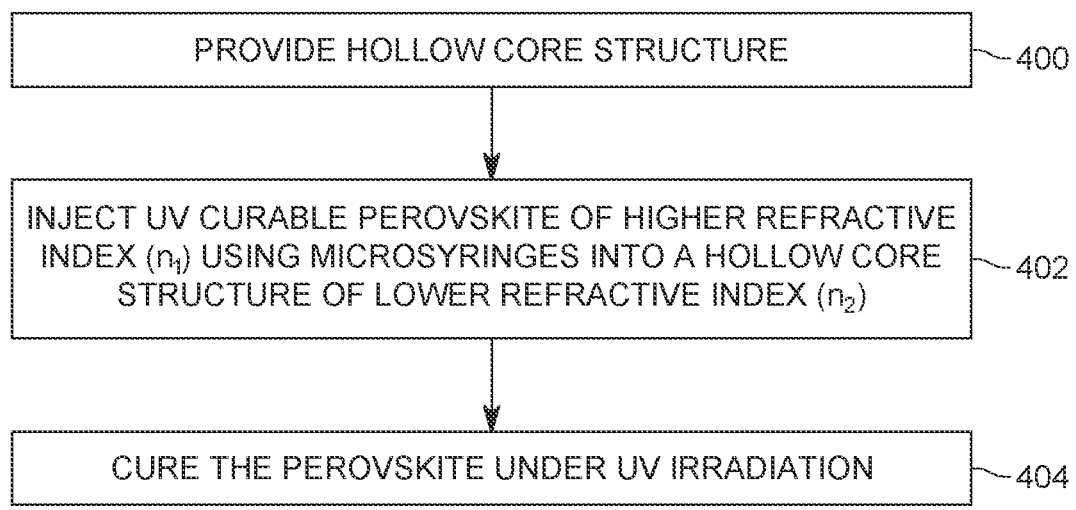
FIG. 4 is a flowchart of a method for forming the perovskite-doped optical fiber.
Figure 5A:
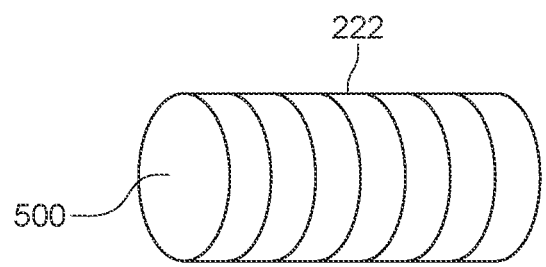
FIGS. 5A to 5C illustrate various stages of the perovskite-doped optical fiber during a manufacturing process.
Figure 5B:
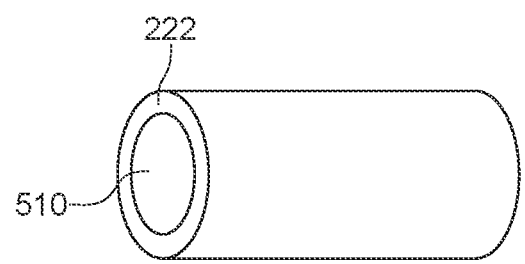
Figure 5C:
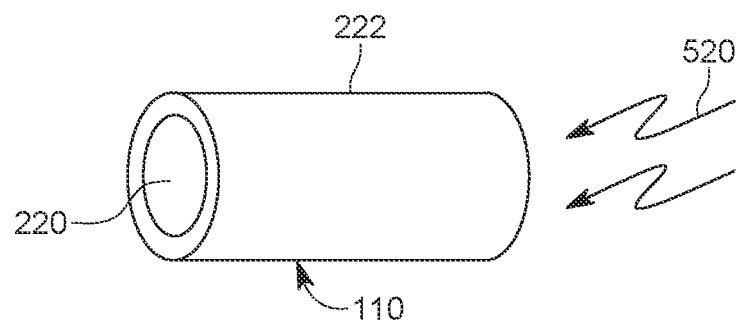

The perovskite-doped optical fiber 110 may be formed in various ways. One approach is now illustrated with regard to FIGS. 4 to 5C. FIG. 4 is a flowchart of a method for forming the perovskite-doped optical fiber. According to this method, in step 400, a hollow core structure, for example, the cladding layer 222 is provided or formed. FIG. 5A shows that the core part 500 of the cladding layer 222 is empty. In step 402, a UV curable perovskite material 510 having a refractive index $n_2$ is injected into the hollow core 500 of the cladding layer 222, as shown in FIG. 5B. The cladding layer 222 has a lower refractive index $n_1$. In step 404, the UV curable perovskite material 510 is cured under UV irradiation 520 so that this material becomes the core layer 220 of the perovskite-doped fiber 110.

In one application, the cladding layer 222 can be made of any material of a refractive index lower than the wavelength-converting material of the core layer 220. For example, the cladding layer may be made of, but not limited to, polydimethylsiloxane (PDMS) and poly(methylmethacrylate) (PMMA). While this method is illustrated for manufacturing a short doped optical fiber, as the injection of the UV curable perovskite material is performed with a micro-syringe, those skilled in the art would understand that this method may be adapted for large-scale, industrial type, manufacturing, for example by the fiber pulling method.

Figure 6:
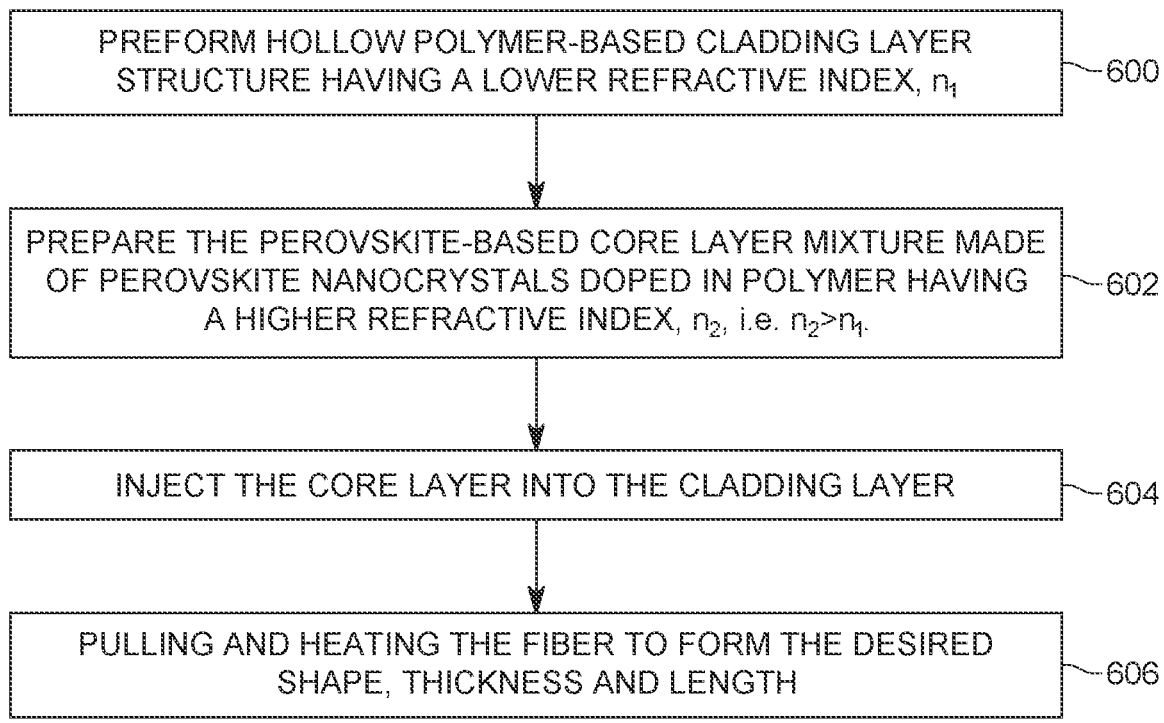
FIG. 6 is a flowchart of a method adapted for large-scale, industrial type, manufacturing of such plastic optical fiber.

Another approach for forming the plastic optical fiber is now discussed with regard to FIG. 6. According to this method, in step 600, a hollow cladding layer (e.g., cladding layer 222) is preform. The hollow cladding layer is polymer-based and has a low refractive index $n_1$. The hollow cladding layer may be formed by casting, injection molding or extrusion. The polymer, similar to the method discussed above with regard to FIG. 4, may be made of PDMS or PMMA. In step 602, the core layer is made by preparing the perovskite-base material having perovskite nanocrystals dopes in polymer and having an index of refraction $n_1$ higher than $n_2$. In step 604, the perovskite-based material is injected into the cladding layer made in step 600, to form the core layer 220 of the perovskite-doped optical fiber 110. In step 606, the perovskite-doped optical fiber 110 is fed into a fiber drawing tower and pulled and heated to form the fiber with the desired shape, thickness, and length.

Figure 7:
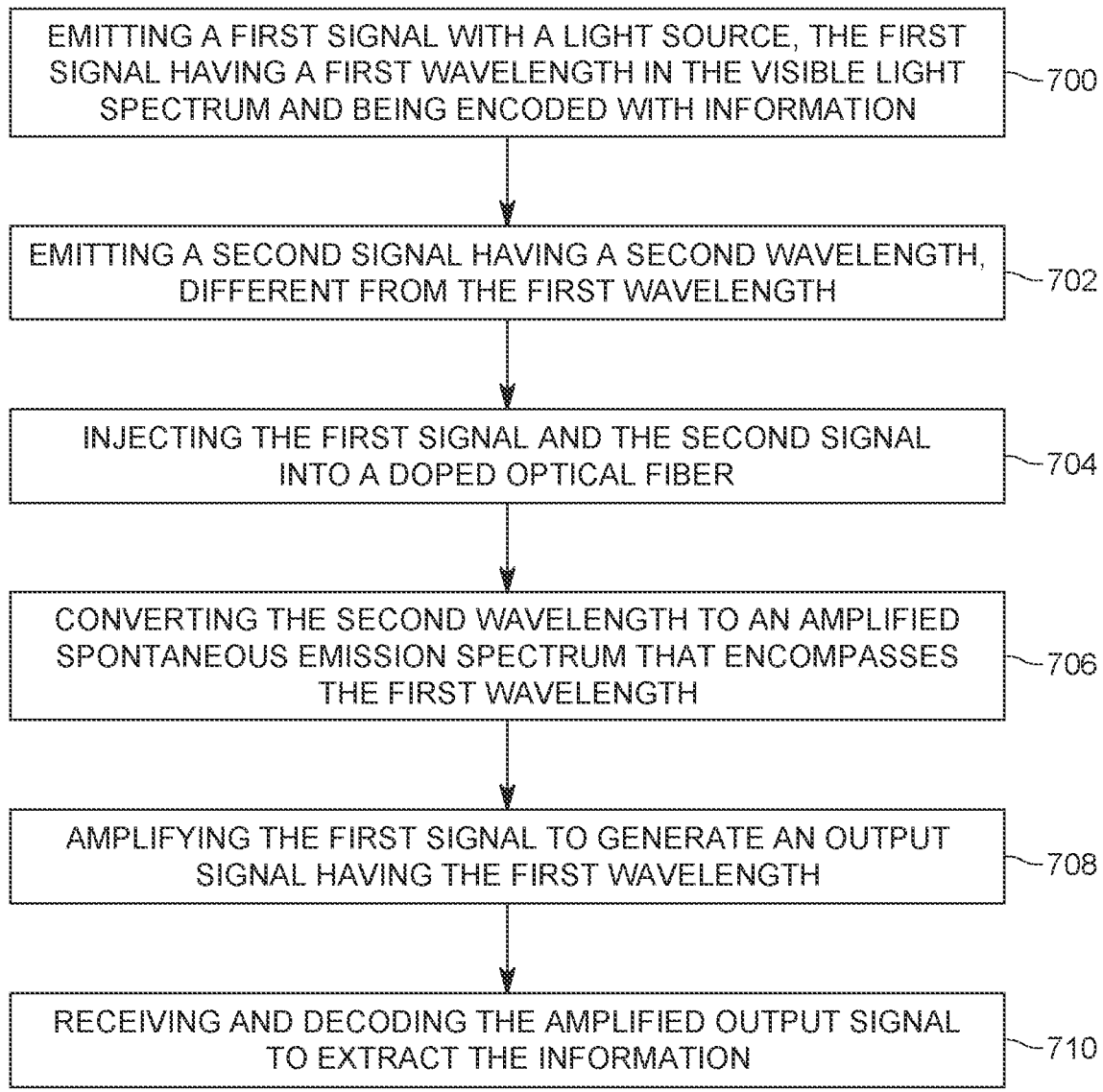
FIG. 7 is a flowchart of a method for exchanging information using a plastic optical fiber communication system that uses a perovskite-doped optical fiber amplifier.

According to an embodiment, a method for transmitting information in a visible light spectrum system is discussed with regard to FIG. 7. The method includes a step 700 of emitting a first signal 112 with a light source 113, the first signal 112 having a first wavelength in the visible light spectrum and being encoded with information, a step 702 of emitting a second signal 116 or 226 having a second wavelength, different from the first wavelength, a step 704 of injecting the first signal 112 and the second signal 116 into a doped optical fiber 110, a step 706 of converting the second wavelength to an amplified spontaneous emission spectrum 111 that encompasses the first wavelength with a wavelength-converting material, which is doping the doped optical fiber 110, a step 708 of amplifying the first signal 112 to generate an output signal 130 having the first wavelength, and a step 710 of receiving and decoding the amplified output signal 130 to extract the information. In one application, the second signal enters a core layer of the doped optical fiber through a cladding layer, which encloses the core layer.

The disclosed embodiments provide a perovskite-doped optical fiber that is used in an optical communication system for providing amplification for the input signal. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] J. Pan, S. P. Sarmah, O. F. Mohammed, and O. M. Bakr, "Air-stable surface-passivated perovskite quantum dots (QDS), methods of making these QDS, and methods of using these QDS," U.S. Patent Application Publication No. 2018/0312754.

What is claimed is:

1. A plastic optical fiber communication system comprising:
a light source that emits a first signal having a first wavelength in a visible light spectrum, the first signal being encoded with information at a high data-rate of 0.1 to 10 Gbit/s;
a pump laser system that emits a pump laser light having a second wavelength, different from the first wavelength;
a perovskite-doped optical fiber excited by the pump laser light to generate an amplified spontaneous emission spectrum that encompasses the first wavelength so as to receive and amplify the first signal for generating an amplified output signal having the first wavelength; and
a photodetector optically coupled to the perovskite-doped optical fiber, and configured to receive the amplified output signal at the high data-rate of 0.1 to 10 Gbit/s,
wherein the amplified output signal is encoded with the information, and
wherein the perovskite-doped optical fiber includes a wavelength-converting perovskite material which has a formula $AMX_3$, where A is an organic component or an inorganic component, M is an alkali metal, and X is a halide.

2. The system of claim 1, further comprising:
first and second gratings located at the ends of the perovskite-doped optical fiber to create an optical cavity; and
a coupler located upstream the first grating, to receive and combine the first signal and the laser light.

3. The system of claim 1, wherein the wavelength-converting perovskite material is configured to change the second wavelength of the pump laser light into the amplified spontaneous emission spectrum that encompasses the first wavelength at the high data-rate.

4. The system of claim 3, wherein the wavelength converting perovskite material is selected to have a decay lifetime of less than 10 ns.

5. The system of claim 3, wherein the wavelength converting perovskite material is selected to convert the second wavelength to include the 400 to 800 nm range.

6. The system of claim 3, wherein the perovskite-doped optical fiber is a plastic optical fiber, and the wavelength converting perovskite material is selected to convert the second wavelength to a lowest loss window centered on 500 nm, which is associated with the plastic optic fiber.

7. The system of claim 3, wherein the perovskite-doped optical fiber is a plastic optical fiber, and the wavelength converting perovskite material is selected to convert the second wavelength to a loss window defined by 560-575 nm, which is associated with a low loss window of the plastic optic fiber.

8. The system of claim 3, wherein the perovskite-doped optical fiber is a plastic optical fiber, and the wavelength converting perovskite material is selected to convert the second wavelength to a loss window centered on 650 nm, which is associated with a low loss window of the plastic optical fiber.

9. The system of claim 1, wherein a cladding layer of the perovskite-doped optical fiber includes polydimethylsiloxane or poly(methyl methacrylate), and a diameter of the perovskite-doped fiber is between 0.01 to 10 mm and the light source is a laser device.

10. A plastic optical fiber communication system comprising:
   a first light source that emits a first signal having a first wavelength in a visible light spectrum, the first signal being encoded with information at a high data-rate of 0.1 to 10 Gbit/s;
   a second light source that emits visible light having a second wavelength, different from the first wavelength;
   a perovskite-doped optical fiber excited by the visible light without any coupling system to generate an amplified spontaneous emission spectrum that encompasses the first wavelength so as to receive and amplify the first signal for generating an amplified output signal having the first wavelength; and
   a photodetector optically coupled to the perovskite-doped optical fiber, and configured to receive the amplified output signal,
   wherein the amplified output signal is encoded with the information, and
   wherein the perovskite-doped optical fiber includes a wavelength-converting perovskite material which has a formula $AMX_3$, where A is an organic component or an inorganic component, M is an alkali metal, and X is a halide.

11. The system of claim 10, further comprising:
   first and second gratings located at the ends of the perovskite-doped optical fiber to create an optical cavity.

12. The system of claim 10, wherein the wavelength-converting perovskite material is configured to change the second wavelength of the visible light into the amplified spontaneous emission spectrum that encompasses the first wavelength at the high data-rate.

13. The system of claim 12, wherein the wavelength converting perovskite material is selected to have a decay lifetime of less than 10 ns.

14. The system of claim 12, wherein the wavelength converting perovskite material is selected to convert the second wavelength to include the 400 to 800 nm range.

15. The system of claim 12, wherein the perovskite-doped optical fiber is a plastic optical fiber, and the wavelength converting perovskite material is selected to convert the second wavelength to a lowest loss window centered on 500 nm, which is associated with the plastic optic fiber.

16. The system of claim 12, wherein the perovskite-doped optical fiber is a plastic optical fiber, and the wavelength converting perovskite material is selected to convert the second wavelength to a loss window defined by 560-575 nm, which is associated with a low loss window of the plastic optic fiber.

17. The system of claim 12, wherein the perovskite-doped optical fiber is a plastic optical fiber, and the wavelength converting perovskite material is selected to convert the second wavelength to a loss window centered on 650 nm, which is associated with a low loss window of the plastic optical fiber.

18. The system of claim 10, wherein a cladding layer of the perovskite-doped optical fiber includes polydimethylsiloxane or poly(methyl methacrylate), and a diameter of the perovskite-doped fiber is between 0.01 to 10 mm.

19. The system of claim 10, wherein the first light source is a laser device and the second light source is a light-emitting diode, a superluminescent diode or a laser device.

20. A method for transmitting information in a visible light spectrum at a high data-rate of 0.1 to 10 Gbit/s, the method comprising:
   emitting a first signal with a light source, the first signal having a first wavelength in the visible light spectrum and being encoded with information;
   emitting a second signal having a second wavelength, different from the first wavelength;
   injecting the first signal and the second signal into a perovskite-doped optical fiber;
   converting the second wavelength to an amplified spontaneous emission spectrum that encompasses the first wavelength using a wavelength-converting material, which is the perovskite-doped optical fiber;
   amplifying the first signal to generate an amplified output signal having the first wavelength; and
   receiving and decoding the amplified output signal to extract the information,
   wherein the perovskite-doped optical fiber includes a wavelength-converting perovskite material which has a formula $AMX_3$, where A is an organic component or an inorganic component, M is an alkali metal, and X is a halide.

21. The method of claim 20, wherein the second signal enters into a core layer of the perovskite-doped optical fiber directly through a cladding layer, which encloses the core layer.

* * * * *